United States Patent [19]

Habozit

[11] 3,890,421
[45] June 17, 1975

[54] METHOD FOR BIAXIALLY DRAWING PLASTIC FILMS
[75] Inventor: Fortune Habozit, Lyon, France
[73] Assignee: La Cellophane, Paris, France
[22] Filed: Aug. 1, 1972
[21] Appl. No.: 276,951

[30] Foreign Application Priority Data
Aug. 5, 1971 France ............................. 71.28731

[52] U.S. Cl. ................... 264/289; 26/57 R; 26/60; 226/108; 264/288; 264/DIG. 73; 425/DIG. 53
[51] Int. Cl. .............................................. B29d 7/24
[58] Field of Search ......... 264/289, 210 R, DIG. 73, 264/288; 26/57 R, 54 B, 61 B, 60; 425/66, DIG. 53; 226/108

[56] References Cited
UNITED STATES PATENTS
| | | | |
|---|---|---|---|
| 2,034,716 | 3/1936 | Dreyfus | 264/DIG. 73 |
| 3,123,854 | 3/1964 | Aykanian | 26/57 R |
| 3,148,410 | 9/1964 | Laurie | 26/54 |
| 3,150,433 | 9/1964 | Kampf | 26/57 R |
| 3,375,313 | 3/1968 | Zygan et al. | 264/289 |
| 3,427,684 | 2/1969 | Tsien | 26/57 R |

*Primary Examiner*—Donald J. Arnold
*Assistant Examiner*—James B. Lowe
*Attorney, Agent, or Firm*—Sherman & Shalloway

[57] ABSTRACT

A method and apparatus for biaxially drawing plastic films wherein a plurality of carriages carry clamps for grasping the edges of a film to be drawn, the carriages each carrying an armature and movable along guide tracks through a drawing frame. A plurality of field windings are longitudinally spaced along each of the guide tracks such that the field windings and the armature cooperate to form a series of linear motors whereby the speed of individual carriages is independent of other carriages. The guide tracks have diverging portions wherein the film may be simultaneously laterally and longitudinally drawn by controlling the speed of the carriages.

4 Claims, 7 Drawing Figures

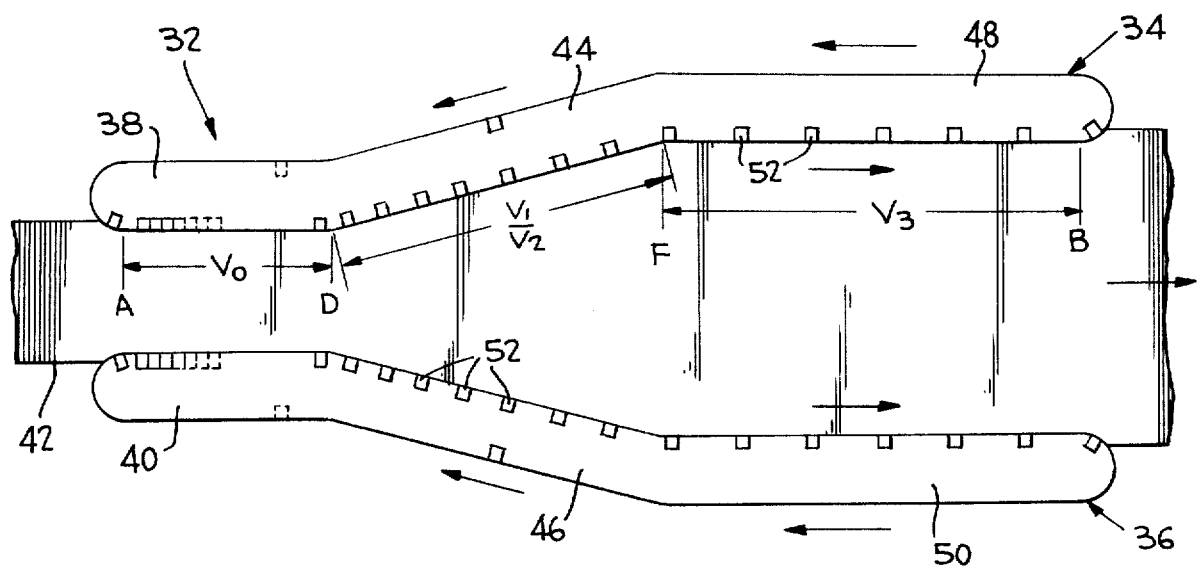
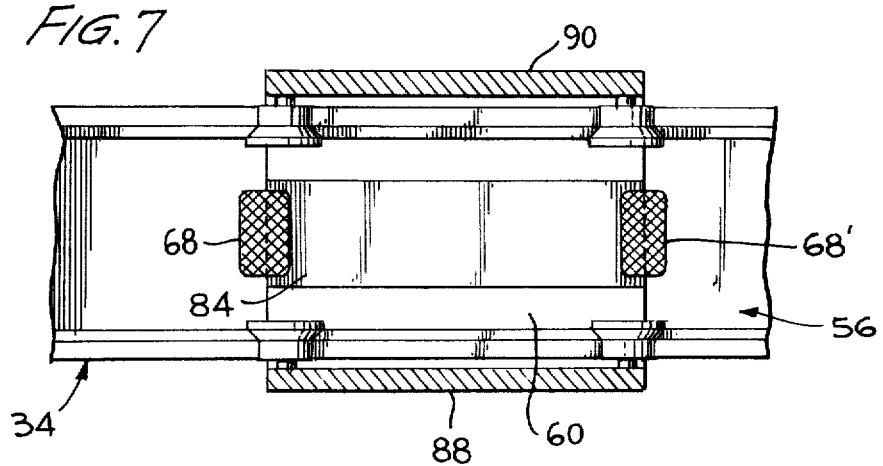

METHOD FOR BIAXIALLY DRAWING PLASTIC FILMS

BACKGROUND OF THE INVENTION

1. Field of the Invention

The present invention pertains to method and apparatus for drawing plastic films and, more particularly, to method and apparatus for drawing plastic films simultaneously in both longitudinal and lateral directions.

2. Discussion of the Prior Art

It is common practice to draw plastic films after their initial formation in that the orientation of molecules of the plastic material greatly improves the properties of the plastic films; and, thus, most commercial quality films have been subjected to a drawing treatment, normally in biaxial orthogonal directions, that is, in longitudinal and lateral directions. Biaxial drawing is generally performed in successive steps by first longitudinally drawing the film and then laterally drawing the film or vice versa. A disadvantage of successive biaxial drawing is that the second drawing step, either lateral or longitudinal, results in a partial destroying of the effects of the first drawing step; and, accordingly, when a film is subjected to successive biaxial drawing treatments, it is necessary to take remedial steps to restore the destroyed effects of the first drawing. To date, no manner has been found to accurately compensate for the destroyed effects, and the remedial steps, thus, represent only compensation by approximation.

In order to avoid the disadvantages of successive biaxial drawing, attempts have been made to provide simultaneous biaxial drawing, that is, drawing in both longitudinal and lateral directions at the same time. One widely used technique of simultaneous biaxial drawing is implemented by extruding the plastic film in a tubular configuration, drawing the tubular film and then cutting the tube. This technique has the disadvantage of providing non-uniform films of irregular thickness; and, accordingly, film produced by this technique has only limited applications.

In order to simultaneously draw a flat plastic film in both longitudinal and lateral directions, the film normally is provided with reinforced edges, and the film is longitudinally drawn by two groups of rollers driven at different speeds while lateral drawing is accomplished by a plurality of clamps gripping the edges of the films and slidably movable in spaced guides, the guides being oriented to increase the space therebetween in the area between the two groups of rollers. The latter method and apparatus cannot produce films having well defined isotropic and anisotropic characteristics in that, while a progressive or gradual controlled drawing in the lateral direction can easily be obtained by adjusting the spacing between the clamps, control of the longitudinal drawing is not easily provided due to the only adjustment mechanism being regulation of the speeds of the two groups of rollers. That is, there is no available longitudinal drawing adjustment for the apparatus with respect to time of drawing. Due to this problem, attempts have been made to subject the film to a progressive longitudinal drawing; and, in order to accomplish such progressive longitudinal drawing, it has been suggested to delete the positive drive for the clamps or to permit the clamps to pivot upon themselves to avoid useless stress on the film and provide maximum freedom of longitudinal drawing. This attempt to solve the problem of longitudinal drawing adjustment is not entirely acceptable since the film cannot be subjected to controlled, graduated or progressive longitudinal drawing.

To provide a small measure of progressive longitudinal drawing, a proposed solution has included driving the clamps which move the film for lateral drawing at variable speeds; however, success of this operation is dependent upon complex mechanisms interconnecting the clamps such that the distance between consecutive clamps increases according to a prescribed law. This proposed solution, thus, is extremely expensive and impractical and is not acceptable for manufacturing plastic films.

Another proposed solution to provide progressive drawing has been to drive the lateral drawing clamps by utilizing mechanisms to assure that the spacing and speed of successive groups of the clamps is increased in stages. One manner of accomplishing such lateral clamp control is to drive the clamps by a series of belts traveling at increased speeds, and another manner is to clamp side rollers at fixed intervals in groups with each group being driven at increasing speeds, as shown and described in French Pat. No. 1,282,598.

All of the above described methods and apparatus require that the extruded films have edges cooled quickly with respect to the central part of the film. That is, the edges of the film must be cooled sufficiently for gripping purposes while the central part of the film is retained at a sufficiently high temperature to permit effective biaxial drawing. This variance in cooling results in undesired complexity of the methods and apparatus and further results in fragile films.

The state-of-the-art, as described above, does not include any methods or apparatus for biaxially drawing a film with full control over both longitudinal and lateral drawing. In practice, biaxial drawing of a film can be accomplished by an infinite number of varying progressive biaxial forces; and, accordingly, in order to biaxially draw a film to desired characteristics full control must be provided over both lateral and longitudinal drawing, especially since the quality of the drawn film is dependent upon the conditions under which drawing is performed. That is, in order to obtain a drawn film of predetermined quality and characteristics, the biaxial drawing must be performed in accordance with predetermined kinematic factors such as along a preselected progressive force curve, and prior art methods and apparatus do not permit sufficient control of lateral and longitudinal drawing to obtain a variably drawn film of predetermined quality and characteristics.

SUMMARY OF THE INVENTION

Accordingly, it is an object of the present invention to overcome the problems of prior art biaxial drawing methods and apparatus by providing method and apparatus for biaxially drawing a film with full lateral and longitudinal drawing control.

Another object of the present invention is to provide method and apparatus for biaxially drawing a plastic film in accordance with predetermined kinematic factors characterized by a previously selected progressive lateral and longitudinal drawing curve.

A further object of the present invention is to provide complete control of simultaneous lateral and longitudinal drawing of a plastic film as determined by an operator independent of any practical apparatus limitations.

The present invention has an additional object in that control is provided not only of drawing but further of slack such that the tension on a film may be decreased in a regulated manner during heat setting after drawing to permit direct control of shrinking and flatness of a drawn plastic film.

Yet another object of the present invention is to grasp the edges of a film with clamps mounted on carriages and movable along diverging guide tracks to laterally draw a plastic film, the arrangement of the guide tracks being such as to cancel the forces and weights resulting from the stress of drawing the film.

A further object of the present invention is to move a plurality of carriages through a drawing zone with speeds independent of each other by mounting an armature on each of the carriages and arranging a plurality of longitudinally spaced stationary field windings along guide tracks in the drawing zone.

The present invention has another object in the application of a predetermined acceleration program to a plurality of individually controlled drawing carriages to superpose on a lateral drawing a controlled longitudinal drawing such that tension applied to the film being drawn may be easily regulated at all times during preheating, drawing and/or heat setting. The precise control of tension and speed during preheating, drawing or heating precisely defines the temperature of the film during these treatments independent of the ratio of established speeds of delivery and advancing rollers upstream and downstream of a drawing frame, respectively.

Yet an additional object of the present invention is to regulate the resistance, tensile strength, modulus of elasticity, shrinkage and flatness of a biaxially drawn film by controlling drawing and slack tension throughout the drawing process while avoiding the limiting factors resulting from successive biaxial drawing.

The present invention is generally characterized in apparatus for drawing a plastic film including a pair of spaced guide tracks adapted to receive a film to be drawn therebetween, each of the guide tracks having a plurality of field windings spaced therealong, a plurality of carriages riding on the guide tracks and each carrying an armature to form a linear motor, the carriages being movable by the variable speeds in accordance with the electrical power supplied to the field windings whereby each of the carriages is movable at a speed independent of the other carriage.

The present invention is further generally characterized in a method of continuously drawing a plastic film including the steps of grasping the edges of the film with clamps mounted on carriages, moving the carriages along a drawing frame, and controlling the speed of each carriage independent of the speed of the other carriages.

Other objects and advantages of the present invention will become apparent from the following description of the preferred embodiment taken in conjunction with the accompanying drawings.

BRIEF DESCRIPTION OF THE DRAWINGS

FIG. 5 is a broken, schematic top plan view of a simultaneous, biaxial drawing frame according to the present invention.

FIG. 7 is a top view partially in section taken along lines 7—7 of FIG. 6.

DESCRIPTION OF THE PREFERRED EMBODIMENT

Figure 1:
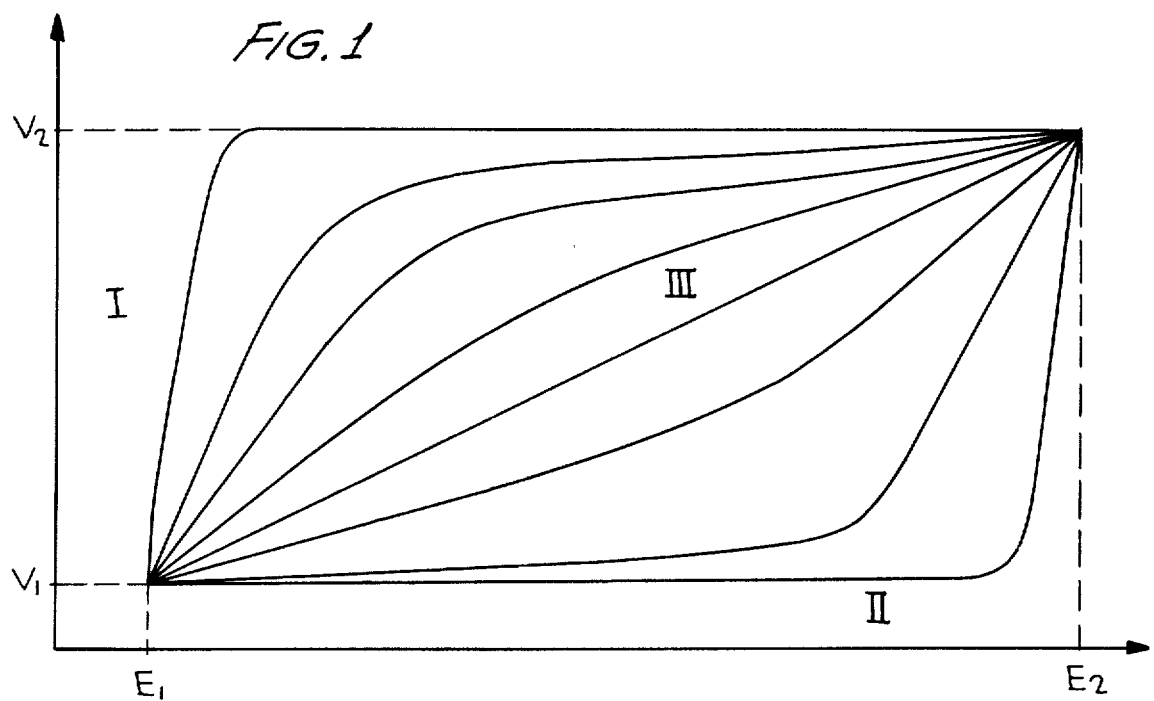
FIG. 1 illustrates curves of speed plotted against distance for biaxial drawing of a plastic film.

In order to more fully understand the present invention, reference is made to the curves of FIG. 1, which are plots of longitudinal film speed V against longitudinal distance E in a drawing zone of a frame. A longitudinal drawing of a given rate, expressed by the ratios of driving speeds $V_2/V_1$ for a film moving between positions $E_1$ and $E_2$, the film being simultaneously biaxially drawn between positions $E_1$ and $E_2$, can be translated into a plurality of curves between curve I, corresponding to normal sequential biaxial drawing with the lateral drawing following the longitudinal drawing, and curve II corresponding to reverse sequential biaxial drawing with the longitudinal drawing following the lateral drawing. Simultaneous biaxial drawing can be performed along an indefinite number of curves between curves I and II with diagonal curve II representing a regularly progressive simultaneous biaxial drawing in both lateral and longitudinal directions.

In accordance with the present invention a method and apparatus are provided to permit continuous flat drawing of plastic films simultaneously in two perpendicular directions with the longitudinal drawing regulated and precisely controlled at all times. To provide this control the film is drawn between individual self-moving clamps, each clamp being mounted on a carriage movable independently of the other carriages along guide tracks having a gradual increase in space therebetween to provide lateral drawing of the film while the movement of the film in the longitudinal direction is provided by the electromotive force (emf) produced by a plurality of linear motors having stationary field windings, the motors being arranged along the guide tracks and having armatures mounted on each of the carriages. The speed of each carriage and associated clamp may be individually controlled by variation of the voltage and/or frequency or of other characteristics of the alternating current supplied to the stationary field windings spaced along the guide tracks or by other suitable means.

In order to provide the independent control of the clamps and carriages, linear induction motors are utilized, such motors being well known and particularly useful in the fields of handling and transportation. Linear induction motors operate on the same general principle as squirrel cage rotary asynchronous motors which are constructed with a stator winding for creating a magentic field turning in the gap of a machine and a rotor having an iron yoke to contain the lines of flux of the magnetic field and a squirrel cage of conductive metal in which the induced currents flow. The interaction between the turning magnetic field currents by the stator and the currents induced in the rotor create Laplace forces on the bars of the squirrel cage perpendicular to both the magnetic field and the currents, and these forces cause the armature to rotate about its longitudinal axis.

Linear motors are operated on substantially the same principle as asynchronous motors and are contructed similar to asynchronous motors that have been cut diametrically and flatened. Since the field winding in a linear motor is maintained stationary, the Laplace forces cause the armature to slide, the sliding field of a linear motor being of the same nature as that of an asynchronous motor. The sliding field is sinusoidal in space and the variation is sinusoidal in time. The sliding speed of the field is equal to the product of the pole pitch and the frequency of the forces of electricity supplied to the field winding; and, accordingly, the sliding speed may be varied by controlling the voltage or frequency of the alternating current supplied to the field winding.

Figure 2:
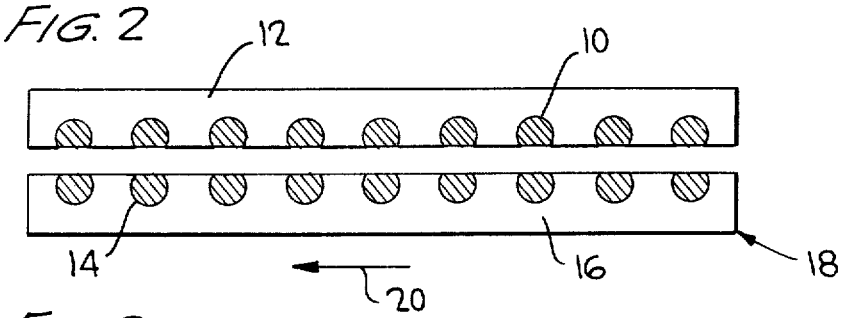
FIG. 2 is a schematic illustration of a conventional linear electric motor.

The principle of operation of linear motors is shown schematically in FIG. 2 wherein a portion of a linear motor is illustrated as including a field winding 10 having a magnetic circuit 12 for creating a magnetic field which induces current in bars 14 housed in a magnetic circuit or yoke 16 of an armature 18 thereby generating forces on bars 14 to cause the armature to slide in the direction indicated by arrow 20.

Figure 3:
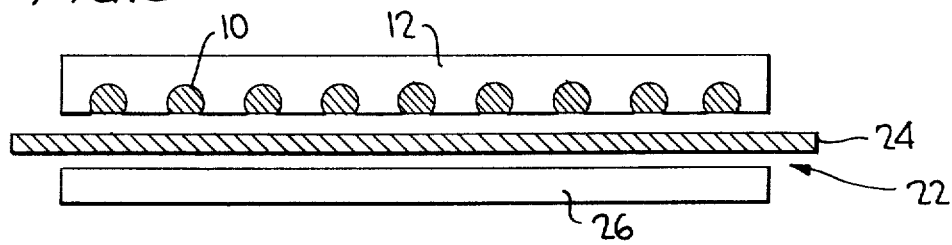
FIGS. 3 and 4 are schematic illustration of modifications of the linear motor of FIG. 2 for use with the present invention.

Utilizing the principle of operation described with respect to FIG. 2 a modification of a linear motor is illustrated in FIG. 3 including a field winding 10 carried in a magnetic circuit or yoke 12. An armature for the motor is generally indicated at 22 and includes an electricity induction member 24 corresponding to bars 14 spaced between the magnetic circuit 12 of the field winding and a magnetic circuit or yoke 26. The member 24 is in the form of a conductive plate. Thus, the conductive metal bars for providing electrical paths for induced currents are disconnected from the magnetic circuit of the armature; and, accordingly, the electrical and magnetic circuits of the armature are disconnected with the magnetic circuit of the armature forming an integral part of the field winding. Consequently, the field winding is made up of magnetic circuit 12, winding 10 and magnetic circuit 26.

Figure 4:
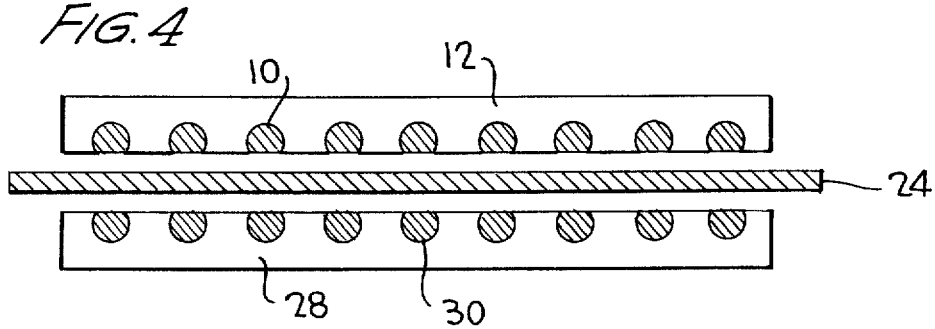

A further modification of the linear motor is illustrated in FIG. 4 and identical parts of the linear motor of FIG. 4 are given reference numbers identical to such parts in the linear motor of FIG. 3 and are not described again. The primary difference between the linear motors of FIGS. 3 and 4 is that in the linear motor of FIG. 4 slots are formed in a magnetic circuit 28 and windings 30 are disposed therein in order to provide a double induction motor thereby economically increasing motor performance.

The linear motors of FIGS. 2, 3 and 4 may be utilized to simultaneously draw a film in both lateral and longitudinal directions in accordance with the present invention; however, other linear motors may also be utilized with the present invention. Accordingly, the linear motors of FIGS. 2, 3 and 4 are intended to be exemplary only, and the structure and design of the motors lies outside the scope of the present invention, it being of importance primarily only that a linear movement can be provided by the motor with variable speeds. For instance, the linear motors can have stationary field windings and moving or sliding armatures or stationary armatures and moving or sliding field windings, the former being preferred.

The method and apparatus of the present invention will now be described with reference to FIGS. 5 and 6.

A drawing frame 32 includes a pair of guide tracks 34 and 36 having parallel portions 38 and 40, respectively, defining a preheating zone for a film 42 between positions A and D, diverging portions 44 and 46, respectively, defining a drawing zone between positions D and F, and parallel portions 48 and 50, respectively, defining a heat setting and/or cooling zone between positions F and B. Guide tracks 34 and 36 carry clamps 52 which clamp the edges of the film 42 as the film is moved through the drawing frame, the clamps 52 in guide tracks 34 and 36 being symmetrical such that a line drawn between pairs of opposite clamps is transverse to the longitudinal axis of the film.

In the preheating zone, the film 42 is initially grasped by clamps 52 at position A and is moved at a speed $V_0$ by the clamps in order to raise the temperature of the film to that required for proper drawing. In the drawing zone, the clamps 52 each travel independently at their own speed, commencing at speed $V_1$ and terminating at speed $V_2$, and the gradual separation or divergence of the clamps as guided by portions 44 and 46 of the guide tracks, while remaining in paired symmetry, simultaneously biaxially draw the film 42 in both lateral and longitudinal directions. In the heat setting and/or cooling zone, the drawn film 42 travels at a constant speed $V_3$ until the film is released by the clamps 52, the film continuing from the drawing frame for further treatment. The clamps 52 commence movement along the drawing frame at points coinciding with positions A where the film is initially grasped; and, after movement through the preheating, drawing and setting zones and release of the film at positions B, the clamps are returned to positions A along the outside of the guide tracks which may be constructed to provide any suitable return path for the clamps; for example, around the outside as shown in FIG. 5 or beneath the operating path similar to a conveyor belt.

Figure 6:
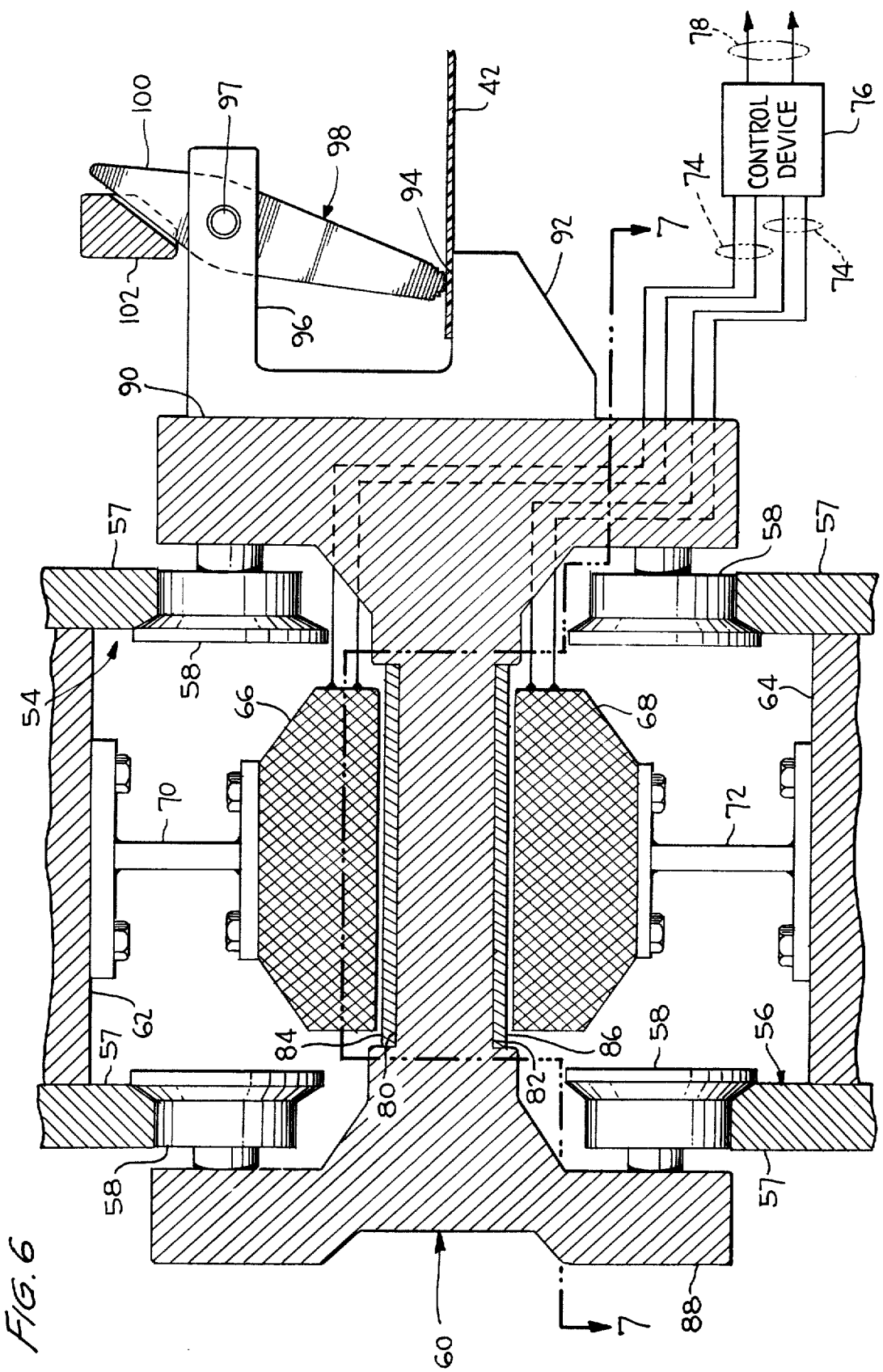
FIG. 6 is a schematic elevation in section of a carriage for use with the drawing frame of FIG. 5.

The linear motor, carriage and clamp structure is shown in more detail in FIGS. 6 and 7, it being noted that such structure is the same for both sides of drawing frame 32. Accordingly, only guide track 34 and the motor and carriage structure therein are shown in FIG. 6, it being understood that the structure in guide track 36 is the same. Guide track 34 has openings on either side defining a pair of upper and lower guide tracks 54 and 56, respectively, for the inside operating path and the outside return path of the housing. Guide tracks 54 and 56 have rails 57 with inner beveled edges to receive beveled edges of upper and lower rollers 58 rotatably mounted on a carriage body 60. Preferably eight rollers are utilized with each carriage, an upper front pair, an upper rear pair, a lower front pair and a lower rear pair in order to absorb stresses produced by the weight of the carriage and by the tension of the film 42 grasped by the clamps 52 carried by the carriage; however, any suitable number of rollers or sliding elements may be utilized as long as the carriage is stably supported for sliding or rolling movement along the guide tracks. Between the upper pair of track rails 57 is a longitudinal support 62, and a longitudinal support 64 is disposed between the lower pair of rails 57.

The linear motor for driving the carriage includes a pair of field windings 66 and 68, field winding 66 being supported by a mounting member 70 secured to longitudinal support 62 and field winding 68 being supported by mounting member 72 secured to longitudinal support 64. The field windings are longitudinally spaced within guide track 34 and each pair of upper and lower field winding has leads 74 for supplying alternating current thereto, the sets of leads 74 each being connected with a control device 76 which may be any suitable device for altering frequency and/or voltage of the electricity supplied on leads 78 from any suitable source. A panel mounting the control devices 76 for each upper and lower pair of field windings is desirably provided to facilitate adjustment of the speeds of the carriages at various positions along the drawing frame. The carriage body 62 is elongated in the longitudinal direction of travel of the carriage and has upper and lower planar recesses 80 and 82, respectively. A pair of elongated armatures 84 and 86 are disposed in recesses 80 and 82, respectively, and cooperate with field windings 66 and 68, respectively, to provide linear movement of the carriage. Each linear motor, thus, includes a pair of field windings and a pair of armatures thereby increasing the operating characteristics of the linear motors and assuring a balanced movement of the carriages. As shown in FIG. 7, the armatures 84 and 86, which are in the form of elongated conductive plates, have a length such that the armatures overlie successive field windings 68 and 68'.

Carriage body 60 has an inner flange 88 and an outer flange 90, and the clamp 52 includes a U-shaped jaw 92 mounted on flange 90 and defining a gripping surface 94 disposed beneath a leg 96 which pivotally mounts at 97 a clamping member 98 having an end movable to grasp the film 42 at the gripping surface 94. The clamping member 98 extends above leg 96 to form a cam follower 100 which is controlled by cams 102 disposed along guide track 34 in order to move the clamping member 98 to grasp the film 42 at the position A and to release the film 42 at the position B. Suitable tension devices, such as springs, may be connected between the cam follower end 100 and leg 96 in order to maintain the clamping member in either an open or closed position such that the clamping member is forced into an opposite position only under the action of cams 102. Preferably, springs bias the clamping member 98 to a closed position such that cams 102 need be placed only adjacent position A to open and close the clamps to initially grasp the film 42 and adjacent position B to open the clamp to release the film 42.

In operation the film is delivered to drawing frame 32 where the clamps are operated to grasp opposite edges of the film and move the film through the preheating zone between positions A and D at a regulated speed of $V_0$. From position D the film moves into the drawing zone where it is drawn laterally due to the progressive movement of the clamps corresponding to the diverging configuration of portions 38 and 40 of the guide tracks 34 and 36 and drawn longitudinally due to the difference in speed of the carriages longitudinally along the guide tracks, the carriages developing a progressively greater speed from $V_1$ to $V_2$ in accordance with a preselected curve relating to kinematic factors. From positions F to B the film passes through the heat setting zone with the linear motors providing a constant speed $V_3$. At position B, the cam 102 operates on cam follower 100 to move clamping member 98 and open the clamps to release the film while the carriages are moved along the return path back to position A.

If during heat setting it is desired to slacken the film, the speed of the carriages as controlled by the linear motors may be gradually or progressively decreased according to any desired program thereby providing direct control of the shrinking and flatness of the film.

From the above it will be seen that in accordance with the present invention longitudinal drawing of a film may be precisely regulated due to the use of a series of linear motors individually controlled independent of one another with respect to longitudinal movement thereof. Thus, biaxial drawing of the film may be accomplished in succession as well as simultaneously such that lateral drawing preceeds longitudinal drawing or vice verse. If it is desired to laterally draw the film prior to longitudinal drawing, the speed of the carriages during an initial portion of the diverging portions 44 and 46 of the guide tracks is maintained constant such that only lateral drawing is accomplished in the initial portion and thereafter the speed of the carriages is progressively increased to longitudinally draw the film throughout the remainder of the diverging portions. In order to longitudinally draw the film prior to lateral drawing, the speed of the carriages is progressively increased at the end portion of the preheating zone where the guide tracks 38 and 40 are parallel to provide longitudinal drawing and thereafter lateral drawing is accomplished in the diverging portions 44 and 46. Furthermore, if only longitudinal drawing is required, portions 44 and 46 of guide tracks 34 and 36, respectively, may be maintained parallel thereby not providing any lateral drawing of the film.

The advantages obtained by the present invention stem substantially from the longitudinal spaced, stationary field windings, which field windings operate on moving armatures of linear motors to impart predetermined speeds to carriages carrying the armatures at the field windings. Thus, since each clamp is self-moving, that is movable independent of the other clamps, an acceleration program may be determined for superposing on the lateral drawing a predetermined, controlled, longitudinal drawing. Accordingly, the tension applied to the film during its movement through the drawing zone may be precisely regulated at all times; and, similarly, the speed of the film in the preheating and heat setting zones may be controlled to precisely control the temperature of the film completely independent of the ratio of the speed of take-off and delivery rollers. Consequently, the take-off and delivery rollers are not required with the method and apparatus of the present invention and the method and apparatus of the present invention are not dependent on kinematic factors of devices with speed variation. By simply regulating the current or other electrical characteristics supplied to each field winding, any specific drawing curve, such as those illustrated in FIG. 1, can be followed in accordance with the present invention.

The interval or spacing between successive field windings is fixed and selected such that the conductive armature plates are long enough to be within the control of successive field windings. The greater the number of field windings and the shorter the length of conductive armature plates, the more gradual and precise control of longitudinal drawing can be accomplished. The control of alternating current supplied to the field windings of the linear motors of pairs of carriages disposed to grip opposite edges of the film are regulated simultaneously in order to provide identical predetermined speed for the pairs of carriages aligned transverse to the longitudinal axis of the film. The regulation of speed of each linear motor unit can be performed by any suitable means such as by modification of the pole pitch, by variation of voltage, by altering frequency and particularly by utilizing variable frequency oscillators to supply power to the field windings.

Inasmuch as the present invention is subject to many variations, modifications and changes in detail, it is intended that all matter described above or shown in the accompanying drawings be interpreted as illustrative and not in a limiting sense.

What is claimed is:

1. A method of drawing a plastic film continuously, comprising the steps of:

grasping sequentially successive portions of the film along opposite edges of the film with opposed pairs of clamps mounted on carriages, wherein the carriages each incorporate a movable element of a linear motor;

advancing the carriages downstream along paths adjacent a center line extending equidistant between the carriages after the clamps have grasped the film while maintaining the pairs of clamps aligned along a second line normal to the extent of the center line, said advancement of the carriages being effected by exciting field windings of the stationary element of the linear motor with which each movable element is associated; and exciting downstream field windings with progressively more energy than adjacent upstream field windings to accelerate each downstream clamp relative to the adjacent upstream clamp and thereby draw the film longitudinally in the direction of advancement.

2. The method of claim 1 wherein the step of advancing the carriages includes the step of moving the carriages laterally away from the center line extending equidistant therebetween as the carriages advance downstream to also draw the film laterally as the film is drawn longitudinally.

3. A method of drawing a plastic film continuously as the film is advanced longitudinally, comprising the steps of:

grasping sequentially successive portions of the film along opposite edges of the film with opposed pairs of clamps mounted on carriages, wherein the carriages each incorporate an armature of a linear motor;

uniformly exciting successive field windings of a stationary element of the linear motor with which the armatures are associated to advance the carriages at a constant speed along parallel paths and thereby advance the film longitudinally;

heating the film as the film advances longitudinally;

exciting successive downstream field windings with progressively more energy than adjacent upstream field windings to accelerate the downstream carriages while diverging the paths over which the pairs of clamps advance to draw the film longitudinally while drawing the film laterally; and exciting successive field windings uniformly while advancing the pairs of clamps at a constant speed along parallel paths extending from the diverging paths and heat-setting the drawn film as the drawn film advances.

4. The method of claim 3 further including the steps of releasing the film from the clamps after heat-setting the film and returning the clamps upstream for subsequent regrasping of the film.

* * * * *